(12) United States Patent
Hu

(10) Patent No.: US 9,921,343 B2
(45) Date of Patent: Mar. 20, 2018

(54) QUANTUM DOT POLARIZER AND MANUFACTURING METHOD THEREOF

(71) Applicant: Shenzhen China Star Optoelectronics Technology Co., Ltd., Shenzhen (CN)

(72) Inventor: Tao Hu, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 136 days.

(21) Appl. No.: 14/908,130

(22) PCT Filed: Dec. 21, 2015

(86) PCT No.: PCT/CN2015/098143
§ 371 (c)(1),
(2) Date: Jan. 28, 2016

(87) PCT Pub. No.: WO2017/049785
PCT Pub. Date: Mar. 30, 2017

(65) Prior Publication Data
US 2017/0261649 A1    Sep. 14, 2017

(30) Foreign Application Priority Data
Sep. 24, 2015    (CN) .......................... 2015 1 0618855

(51) Int. Cl.
*B01F 3/12*    (2006.01)
*B32B 27/08*    (2006.01)
(Continued)

(52) U.S. Cl.
CPC .............. *G02B 1/14* (2015.01); *B01F 3/1214* (2013.01); *B29B 7/002* (2013.01); *B32B 27/08* (2013.01);
(Continued)

(58) Field of Classification Search
CPC .... B01F 3/1207; B01F 3/1214; B01F 3/1221; B01F 2003/125; B01F 2215/0477;
(Continued)

(56) References Cited

U.S. PATENT DOCUMENTS

2015/0275078 A1* 10/2015 Vo .................. C09K 11/703
                                                          252/301.36
2016/0252658 A1*  9/2016 Kuo .................... G02B 1/14
                                                          359/487.01
(Continued)

FOREIGN PATENT DOCUMENTS

CN    102854558 A    1/2013
CN    104749680 A    7/2015
(Continued)

Primary Examiner — Michael A Tolin
(74) Attorney, Agent, or Firm — Leong C. Lei

(57) ABSTRACT

The invention provides the following advantages: the present invention provides a quantum dot polarizer and manufacturing method thereof. The quantum dot polarizer comprises a first protective layer and a second protective layer, and the first protective layer or the second protective layer being a complex film comprising quantum dots. As such, without increasing the thickness of display, the invention can improve color spectrum and transmittance, and is applicable to ultra-thin display devices at low cost. The manufacturing method adds the quantum dots to the cotton glue for forming protective layers by extension or coating process to obtain quantum dot protective layer used for quantum dot polarizer. As such, the invention can avoid humidity and oxygen affecting the quantum dots and reduce cost by eliminating manufacturing independent quantum dot element separately.

11 Claims, 2 Drawing Sheets

(51) Int. Cl.
*B82Y 20/00* (2011.01)
*C09K 11/02* (2006.01)
*G02B 1/08* (2006.01)
*G02B 5/30* (2006.01)
*G02B 1/14* (2015.01)
*B29B 7/00* (2006.01)
*G02F 1/1335* (2006.01)

(52) U.S. Cl.
CPC .............. *C09K 11/02* (2013.01); *G02B 1/08* (2013.01); *G02B 5/30* (2013.01); *G02B 5/3033* (2013.01); *G02F 1/1335* (2013.01); *G02F 1/133528* (2013.01); *B01F 2215/0477* (2013.01); *B01F 2215/0481* (2013.01); *B82Y 20/00* (2013.01); *Y10S 977/774* (2013.01)

(58) Field of Classification Search
CPC . B01F 2215/0481; B29B 7/002; B32B 27/08; B32B 27/306; B32B 2037/243; B82Y 20/00; C08L 1/10; C08L 1/12; C09K 11/02; G02B 1/08; G02B 1/105; G02B 1/14; G02B 5/30; G02B 5/3016; G02B 5/3025; G02B 5/3033; G02F 1/133528; G02F 1/133617; G02F 2001/133614; G02F 2202/36; Y10S 977/774; Y10S 977/95

See application file for complete search history.

(56) References Cited

U.S. PATENT DOCUMENTS

2016/0347996 A1* 12/2016 Shimamoto ..... H01L 31/035218
2017/0017118 A1* 1/2017 Yonemoto ............ G02B 5/3016

FOREIGN PATENT DOCUMENTS

| CN | 104910424 A | 9/2015 | |
|---|---|---|---|
| WO | WO-2015114679 A1 * | 8/2015 | ..... H01L 31/035218 |
| WO | WO-2015147287 A1 * | 10/2015 | ........... G02B 5/3016 |

* cited by examiner

QUANTUM DOT POLARIZER AND MANUFACTURING METHOD THEREOF

BACKGROUND OF THE INVENTION

1. Field of the Invention

The present invention relates to the field of display, and in particular to a quantum dot (QD) polarizer and manufacturing method thereof.

2. The Related Arts

To meet the demands on the display for wide spectrum and color saturation, an effective option for major display manufacturers is to add photoluminescence quantum dots (QD) in the backlight structure.

In use of QD as a nano-scale material, the quantum confinement effect is obvious because of the narrow size (<10 nano). When excited by light, and the excitation energy level exceeds the band gap, the electrons leap from valence band to conduction band, and emitted in an optical energy to form different colors. Also, by controlling the size of QD, different colors can be adjusted. Using the blue light from the light emitting diode (LED) is able to effectively increase the color spectrum of the display.

The known mainstream QD backlight technologies are divided into two approaches: one is to package the QD into a glass tube and placed in front of the backlight; and the other is to manufacture the QD into a thin film for insertion between the backlight module and the display panel. Understandably, these technologies require specific facility for manufacturing QD, and thus increase cost.

As shown in FIG. 1, a common polarizer has a layered structure, from top down, comprising: a surface protective film 110, a first protective layer 120, a polarization layer 130, a second protective layer 140, an adhesive layer 150, and a peel-off protective film 160, wherein when attaching the polarizer, the peel-off film 160 is peeled off to expose the adhesive layer 150. After the polarizer is attached, the surface protective film 110 will be peeled off. The core of the structure of the polarizer is the polarization layer 130, which usually comprises a polyvinyl alcohol (PVA) layer with iodine molecules able to polarize; and the first protective layer 120 and the second protective layer 140 are transparent cellulose triacetate (TAC) layer, mainly to maintain the polarization molecules in the polarization layer 130 to stay extended to avoid dehydration and to protect from external influence.

Therefore, the layered structure of the polarizer is suitable for adding QD film, such as, China Patent CN102854558 and Korea Patent KR20070107498A, disclosed methods for adding a QD layer, i.e., a quantum bar layer with polarization effect between the protective layer and the polarization layer. However, these methods require additional QD layer process, which leads to degraded transmittance, higher cost and thicker display devices.

SUMMARY OF THE INVENTION

The object of the present invention is to provide a quantum dot polarizer, able to improve color spectrum and transmittance of the display, without increase the thickness of the display, suitable for ultra-thin applications.

Another object of the present invention is to provide a manufacturing method for quantum dot polarizer, directly doping the quantum dots into the cotton glue for protective layer to manufacture a protective layer with quantum dots, so as to manufacture quantum dot polarizer, to eliminate the preparation of independent quantum dot elements for the backlight module to reduce the cost.

To achieve the above object, the present invention provides a quantum dot polarizer, which comprises a polarization layer, a first protective layer and a second protective layer, disposed respectively on the two sides of the polarization layer, a surface protective film disposed on the first protective layer, an adhesive layer disposed on the second protection layer and a peel-off film disposed on the adhesive layer; wherein the first protective layer or the second protective layer being a complex film comprising quantum dots.

When the quantum dot polarizer is used as an upper polarizer for an LCD panel, the first protective layer is the complex film comprising quantum dots.

When the quantum dot polarizer is used as a lower polarizer for an LCD panel, the second protective layer is the complex film comprising quantum dots.

The present invention also provides a manufacturing method for quantum dot polarizer, which comprises: Step 1: preparing a cotton glue for quantum dot protective layer; Step 2: forming a complex film comprising quantum dots with the cotton glue to obtain a quantum dot protective layer through an extension process or a coating process; Step 3: using the quantum dot protective layer to manufacture the quantum dot polarizer; wherein the quantum dot polarizer comprising a polarization layer, a first protective layer and a second protective layer, disposed respectively on the two sides of the polarization layer, a surface protective film disposed on the first protective layer, an adhesive layer disposed on the second protection layer and a peel-off film disposed on the adhesive layer; and the first protective layer or the second protective layer being a quantum dots protective layer obtained in Step 2; Step 1 comprising the following steps: Step 11: mixing a material for the protective layer and a solution, slowly stirring at a speed of 10-22 rpm/min for 1-3 hours; Step 12: accelerating stirring speed to 23-38 rpm/min for 2-3.5 hours; Step 13: accelerating stirring speed to 40-60 rpm/min for 1.5-2.5 hours; Step 14: slowing down stirring speed to 10-22 rpm/min for 0.5-2 hours; Step 1 further comprising: adding plasticizer in any one of the above Steps 11-14 to obtain a protective layer solution with better solubility; and adding quantum dots in any one of the above Steps 11-14.

The quantum dots are one or more of the following doped or non-doped quantum dots: ZnS, CdS, ZnO, GaN, GaSe, ZnSe, CdSe, ZnTe, CdTe, PbTe, InP, CdAs.

The quantum dots are graphene quantum dots or carbon quantum dots.

In Step 11, the material for the protective layer is poly triacetylcellulose with 250-350 degree of polymerization.

In Step 11, the solution comprises a primary solution and an auxiliary solution, the primary solution is dichloromethane, and the auxiliary solution is methanol, ethanol, or butanol.

The plasticizer is a mixed plasticizer comprising a primary plasticizer and an auxiliary plasticizer, the primary plasticizer is triphenyl phosphate, and the auxiliary plasticizer is one or more of the following: dibutyl phthalate, butoxyethyl phthalate, and octyl phthalate.

In Step 11, the stirring time is 2 hours; in Step 12, the stirring time is 3 hours; in Step 13, the stirring time is 2 hours; and in Step 14, the stirring time is 1 hour.

The present invention also provides a manufacturing method for quantum dot polarizer, which comprises: Step 1: preparing a cotton glue for quantum dot protective layer; Step 2: forming a complex film comprising quantum dots with the cotton glue to obtain a quantum dot protective layer through an extension process or a coating process; Step 3: using the quantum dot protective layer to manufacture the quantum dot polarizer; wherein the quantum dot polarizer comprising a polarization layer, a first protective layer and a second protective layer, disposed respectively on the two sides of the polarization layer, a surface protective film disposed on the first protective layer, an adhesive layer disposed on the second protection layer and a peel-off film disposed on the adhesive layer; and the first protective layer or the second protective layer being a quantum dots protective layer obtained in Step 2; Step 1 comprising the following steps: Step 11: mixing a material for the protective layer and a solution, slowly stirring at a speed of 10-22 rpm/min for 1-3 hours; Step 12: accelerating stirring speed to 23-38 rpm/min for 2-3.5 hours; Step 13: accelerating stirring speed to 40-60 rpm/min for 1.5-2.5 hours; Step 14: slowing down stirring speed to 10-22 rpm/min for 0.5-2 hours; Step 1 further comprising: adding plasticizer in any one of the above Steps 11-14 to obtain a protective layer solution with better solubility; and adding quantum dots in any one of the above Steps 11-14; in Step 11, the material for the protective layer is poly triacetylcellulose with 250-350 degree of polymerization; in Step 11, the solution comprises a primary solution and an auxiliary solution, the primary solution is dichloromethane, and the auxiliary solution is methanol, ethanol, or butanol; the plasticizer is a mixed plasticizer comprising a primary plasticizer and an auxiliary plasticizer, the primary plasticizer is triphenyl phosphate, and the auxiliary plasticizer is one or more of the following: dibutyl phthalate, butoxyethyl phthalate, and octyl phthalate.

Compared to the known techniques, the present invention provides the following advantages: the present invention provides a quantum dot polarizer and manufacturing method thereof. The quantum dot polarizer comprises a first protective layer and a second protective layer, and the first protective layer or the second protective layer being a complex film comprising quantum dots. As such, without increasing the thickness of display, the invention can improve color spectrum and transmittance, and is applicable to ultra-thin display devices at low cost. The manufacturing method adds the quantum dots to the cotton glue for forming protective layers by extension or coating process to obtain quantum dot protective layer used for quantum dot polarizer. As such, the invention can avoid humidity and oxygen affecting the quantum dots and reduce cost by eliminating manufacturing independent quantum dot element separately.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
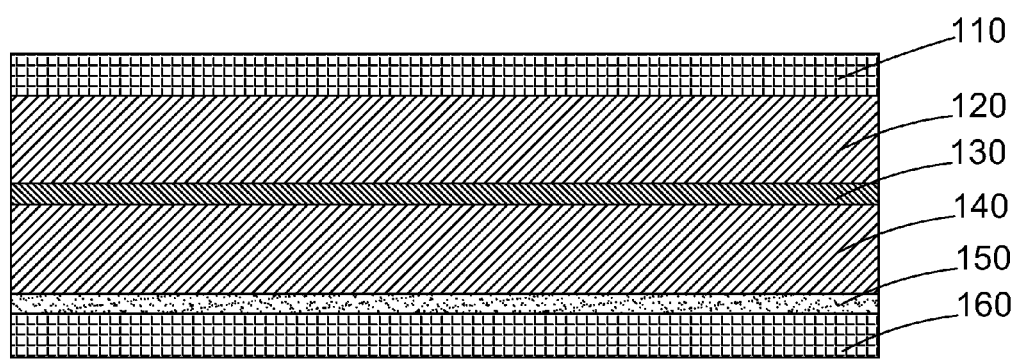
FIG. 1 is a schematic view showing the structure for a known polarizer.
Figure 2:
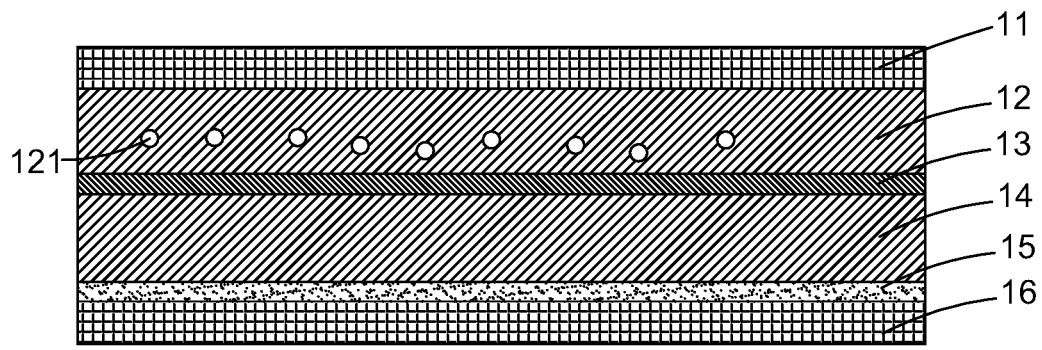
FIG. 2 is a schematic view showing the structure of the first embodiment of a quantum dot polarizer provided by an embodiment of the present invention.
Figure 3:
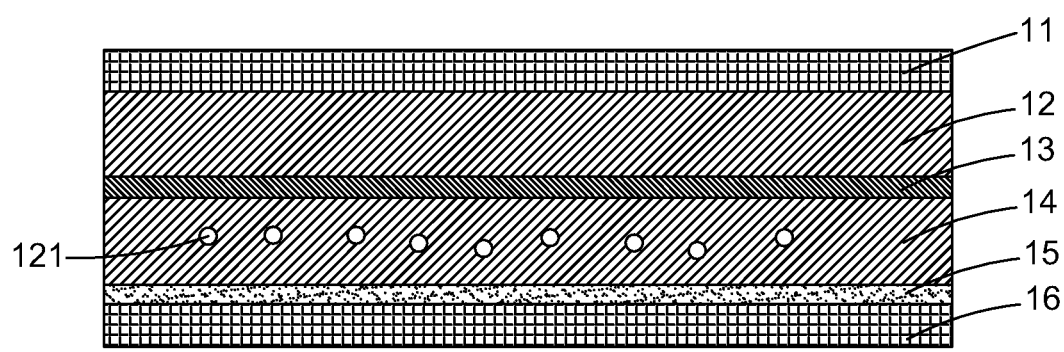
FIG. 3 is a schematic view showing the structure of the second embodiment of a quantum dot polarizer provided by an embodiment of the present invention.

Refer to FIGS. 2-3. The present invention provides a quantum dot polarizer, which comprises: a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; wherein the first protective layer 12 or the second protective layer 14 being a complex film comprising quantum dots 121.

Specifically, when the quantum dot polarizer is used for an liquid crystal display (LCD) panel, to prevent quantum dots from changing the linear polarization state, the first protective layer 12 or the second protective layer 14 comprising quantum dots 121 must be disposed at the side away from the backlight module of the LCD panel.

As shown in FIG. 2, in the first embodiment of the present invention, the quantum dot polarizer is used as the upper polarizer in the LCD panel, and the first protective layer 12 is the complex film comprising quantum dots 121. The quantum dot polarizer comprises, from top to bottom, the surface protective film 11, the first protective layer 12, the polarization layer 13, the second protective layer 14, the adhesive layer 15 and the peel-off protective film 16.

As shown in FIG. 3, in the second embodiment of the present invention, the quantum dot polarizer is used as the lower polarizer in the LCD panel, and the second protective layer 14 is the complex film comprising quantum dots 121. The quantum dot polarizer comprises, from top to bottom, the surface protective film 11, the first protective layer 12, the polarization layer 13, the second protective layer 14, the adhesive layer 15 and the peel-off protective film 16.

The quantum dot polarizer of the present invention comprises a first protective layer and a second protective layer, and the first protective layer or the second protective layer being a complex film comprising quantum dots. As such, without increasing the thickness of display, the invention can improve color spectrum and transmittance, and is applicable to ultra-thin display devices at low cost.

The present invention also provides a manufacturing method for quantum dot polarizer, which comprises:

Step 1: preparing a cotton glue for quantum dot protective layer;

Step 2: forming a complex film comprising quantum dots with the cotton glue to obtain a quantum dot protective layer through an extension process or a coating process; and Step 3: using the quantum dot protective layer to manufacture the quantum dot polarizer;

Wherein the quantum dot polarizer comprises a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; and the first protective layer 12 or the second protective layer 14 is a quantum dots protective layer obtained in Step 2.

Specifically, Step 1 comprises the following steps:

Step 11: mixing a material for the protective layer and a solution, slowly stirring at a speed of 10-22 rpm/min for 1-3 hours;

Step 12: accelerating stirring speed to 23-38 rpm/min for 2-3.5 hours;

Step 13: accelerating stirring speed to 40-60 rpm/min for 1.5-2.5 hours; and

Step 14: slowing down stirring speed to 10-22 rpm/min for 0.5-2 hours;

Step 1 further comprises: adding plasticizer in any one of the above Steps 11-14 to obtain a protective layer solution with better solubility; and adding quantum dots in any one of the above Steps 11-14.

Specifically, in Step 11, the material for the protective layer is poly triacetylcellulose with 250-350 degree of polymerization; in Step 11, the solution comprises a primary solution and an auxiliary solution, the primary solution is dichloromethane, and the auxiliary solution is methanol, ethanol, or butanol.

Specifically, the quantum dots are one or more of the following doped or non-doped quantum dots: ZnS, CdS, ZnO, GaN, GaSe, ZnSe, CdSe, ZnTe, CdTe, PbTe, InP, CdAs; or, the quantum dots are graphene quantum dots or carbon quantum dots; the plasticizer is a mixed plasticizer comprising a primary plasticizer and an auxiliary plasticizer, the primary plasticizer is triphenyl phosphate, and the auxiliary plasticizer is one or more of the following: dibutyl phthalate, butoxyethyl phthalate, and octyl phthalate.

The following is a preferred embodiment of the manufacturing method for quantum dot polarizer of the present invention.

Embodiment 1

Step 1: preparing a cotton glue for quantum dot protective layer; specifically, Step 1 comprising:

Step 11: mixing the protective layer material TAC and a solution, slowly stirring at a speed of 10 rpm/min for 3 hours;

Step 12: accelerating stirring speed to 23 rpm/min, adding plasticizer, stirring for 3.5 hours;

Step 13: accelerating stirring speed to 40 rpm/min for 2.5 hours; and

Step 14: slowing down stirring speed to 10 rpm/min, adding quantum dots, stirring for 2 hours to obtain the cotton glue with quantum dots;

Step 2: forming a complex film comprising quantum dots with the cotton glue to obtain a quantum dot protective layer through an extension process or a coating process; and Step 3: using the quantum dot protective layer to manufacture the quantum dot polarizer;

Specifically, the quantum dot polarizer comprises a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; and the first protective layer 12 or the second protective layer 14 is a quantum dots protective layer obtained in Step 2.

Embodiment 2

Step 1: preparing a cotton glue for quantum dot protective layer; specifically, Step 1 comprising:

Step 11: mixing the protective layer material TAC and a solution, slowly stirring at a speed of 22 rpm/min for 1 hour;

Step 12: accelerating stirring speed to 38 rpm/min, adding plasticizer, stirring for 2 hours;

Step 13: accelerating stirring speed to 60 rpm/min for 1.5 hours; and

Step 14: slowing down stirring speed to 22 rpm/min, adding quantum dots, stirring for 0.5 hour to obtain the cotton glue with quantum dots;

Step 2: forming a complex film comprising quantum dots with the cotton glue to obtain a quantum dot protective layer through an extension process or a coating process; and Step 3: using the quantum dot protective layer to manufacture the quantum dot polarizer;

Specifically, the quantum dot polarizer comprises a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; and the first protective layer 12 or the second protective layer 14 is a quantum dots protective layer obtained in Step 2.

Embodiment 3

Step 1: preparing a cotton glue for quantum dot protective layer; specifically, Step 1 comprising:

Step 11: mixing the protective layer material TAC and a solution, slowly stirring at a speed of 15 rpm/min for 2 hours;

Step 12: accelerating stirring speed to 30 rpm/min, adding plasticizer, stirring for 3 hours;

Step 13: accelerating stirring speed to 50 rpm/min for 2 hours; and

Step 14: slowing down stirring speed to 20 rpm/min, adding quantum dots, stirring for 1 hour to obtain the cotton glue with quantum dots;

Step 2: forming a complex film comprising quantum dots with the cotton glue to obtain a quantum dot protective layer through an extension process or a coating process; and Step 3: using the quantum dot protective layer to manufacture the quantum dot polarizer;

Specifically, the quantum dot polarizer comprises a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; and the first protective layer 12 or the second protective layer 14 is a quantum dots protective layer obtained in Step 2.

Embodiment 4

Step 1: preparing a cotton glue for quantum dot protective layer; specifically, Step 1 comprising:

Step 11: mixing the protective layer material TAC and a solution, slowly stirring at a speed of 15 rpm/min for 2 hours;

Step 12: accelerating stirring speed to 30 rpm/min for 3 hours;

Step 13: accelerating stirring speed to 50 rpm/min, adding plasticizer, stirring for 2 hours; and Step 14: slowing down stirring speed to 210 rpm/min, adding quantum dots, stirring for 1 hour to obtain the cotton glue with quantum dots;

Step 2: forming a complex film comprising quantum dots with the cotton glue to obtain a quantum dot protective layer through an extension process or a coating process; and Step 3: using the quantum dot protective layer to manufacture the quantum dot polarizer;

Specifically, the quantum dot polarizer comprises a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; and the first protective layer 12 or the second protective layer 14 is a quantum dots protective layer obtained in Step 2.

Embodiment 5

Step 1: preparing a cotton glue for quantum dot protective layer; specifically, Step 1 comprising:

Step 11: mixing the protective layer material TAC and a solution, slowly stirring at a speed of 15 rpm/min for 2 hours;

Step 12: accelerating stirring speed to 30 rpm/min for 3 hours;

Step 13: accelerating stirring speed to 50 rpm/min, adding plasticizer and quantum dots, stirring for 2.5 hours; and Step 14: slowing down stirring speed to 10 rpm/min for 2 hours to obtain the cotton glue with quantum dots;

Step 2: forming a complex film comprising quantum dots with the cotton glue to obtain a quantum dot protective layer through an extension process or a coating process; and Step 3: using the quantum dot protective layer to manufacture the quantum dot polarizer;

Specifically, the quantum dot polarizer comprises a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; and the first protective layer 12 or the second protective layer 14 is a quantum dots protective layer obtained in Step 2.

Embodiment 6

Step 1: preparing a cotton glue for quantum dot protective layer; specifically, Step 1 comprising:

Step 11: mixing the protective layer material TAC and a solution, slowly stirring at a speed of 15 rpm/min for 2 hours;

Step 12: accelerating stirring speed to 30 rpm/min, adding plasticizer, stirring for 3 hours;

Step 13: accelerating stirring speed to 50 rpm/min, adding quantum dots, stirring for 2 hours; and Step 14: slowing down stirring speed to 20 rpm/min for 1 hour to obtain the cotton glue with quantum dots;

Step 2: forming a complex film comprising quantum dots with the cotton glue to obtain a quantum dot protective layer through an extension process or a coating process; and Step 3: using the quantum dot protective layer to manufacture the quantum dot polarizer;

Specifically, the quantum dot polarizer comprises a polarization layer 13, a first protective layer 12 and a second protective layer 14, disposed respectively on the two sides of the polarization layer 13, a surface protective film 11 disposed on the first protective layer 12, an adhesive layer 15 disposed on the second protection layer 14 and a peel-off film 16 disposed on the adhesive layer 15; and the first protective layer 12 or the second protective layer 14 is a quantum dots protective layer obtained in Step 2.

In summary, the present invention provides a quantum dot polarizer and manufacturing method thereof. The quantum dot polarizer comprises a first protective layer and a second protective layer, and the first protective layer or the second protective layer being a complex film comprising quantum dots. As such, without increasing the thickness of display, the invention can improve color spectrum and transmittance, and is applicable to ultra-thin display devices at low cost. The manufacturing method adds the quantum dots to the cotton glue for forming protective layers by extension or coating process to obtain quantum dot protective layer used for quantum dot polarizer. As such, the invention can avoid humidity and oxygen affecting the quantum dots and reduce cost by eliminating manufacturing independent quantum dot element separately.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A method for manufacturing a quantum dot polarizer comprising:

Step 1: preparing a quantum dot protective layer solution;

Step 2: forming a complex film comprising quantum dots from the quantum dot protective layer solution, the complex film being a quantum dot protective layer;

Step 3: manufacturing the quantum dot polarizer using the quantum dot protective layer as a protective layer for a polarization layer;

wherein the quantum dot polarizer comprises the polarization layer, a first protective layer and a second protective layer, disposed respectively on the two sides of the polarization layer, a surface protective film disposed on the first protective layer, an adhesive layer disposed on the second protection layer and a peel-off film disposed on the adhesive layer; and the first protective layer or the second protective layer is the quantum dot protective layer obtained in Step 2;

Step 1 comprising the following sequential steps performed in the recited order:

Step 11: mixing poly triacetylcellulose and a solvent and slowly stirring the mixture at a stirring speed of 10-22 rpm/min for 1-3 hours;

Step 12: accelerating the stirring speed to 23-38 rpm/min for 2-3.5 hours;

Step 13: accelerating the stirring speed to 40-60 rpm/min for 1.5-2.5 hours; and Step 14: slowing down the stirring speed to 10-22 rpm/min for 0.5-2 hours;

Step 1 further comprising adding plasticizer in any one of the above Steps 11-14 to enhance the solubility of the poly triacetylcellulose in the quantum dot protective layer solution; and adding quantum dots to the mixture in any one of the above Steps 11-14.

2. The method according to claim 1, wherein the quantum dots are doped or non-doped quantum dots and they are selected from one or more of the following materials: ZnS, CdS, ZnO, GaN, GaSe, ZnSe, CdSe, ZnTe, CdTe, PbTe, InP, CdAs.

3. The method according to claim 1, wherein the quantum dots are graphene quantum dots or carbon quantum dots.

4. The method according to claim 1, wherein the poly triacetylcellulose has a degree of polymerization of 250-350.

5. The method according to claim 1, wherein in Step 11, the solvent comprises a primary solvent and an auxiliary solvent, the primary solvent is dichloromethane, and the auxiliary solvent is methanol, ethanol, or butanol.

6. The method according to claim 1, wherein the plasticizer is a mixed plasticizer comprising a primary plasticizer and an auxiliary plasticizer, the primary plasticizer is triphenyl phosphate, and the auxiliary plasticizer is one or more of the following: dibutyl phthalate, butoxyethyl phthalate, and octyl phthalate.

7. The method according to claim 1, wherein in Step 11, the stirring time is 2 hours; in Step 12, the stirring time is 3 hours; in Step 13, the stirring time is 2 hours; and in Step 14, the stirring time is 1 hour.

8. A method for manufacturing a quantum dot polarizer comprising:
   Step 1: preparing a quantum dot protective layer solution;
   Step 2: forming a complex film comprising quantum dots from the quantum dot protective layer solution, the complex film being a quantum dot protective layer;
   Step 3: manufacturing the quantum dot polarizer using the quantum dot protective layer as a protective layer for a polarization layer;
   wherein the quantum dot polarizer comprises the polarization layer, a first protective layer and a second protective layer, disposed respectively on the two sides of the polarization layer, a surface protective film disposed on the first protective layer, an adhesive layer disposed on the second protection layer and a peel-off film disposed on the adhesive layer; and the first protective layer or the second protective layer is the quantum dot protective layer obtained in Step 2;
   Step 1 comprising the following sequential steps performed in the recited order:
   Step 11: mixing poly triacetylcellulose and a solvent and slowly stirring the mixture at a stirring speed of 10-22 rpm/min for 1-3 hours;
   Step 12: accelerating the stirring speed to 23-38 rpm/min for 2-3.5 hours;
   Step 13: accelerating the stirring speed to 40-60 rpm/min for 1.5-2.5 hours; and
   Step 14: slowing down the stirring speed to 10-22 rpm/min for 0.5-2 hours;
   Step 1 further comprising adding plasticizer in any one of the above Steps 11-14 to enhance the solubility of the poly triacetylcellulose in the quantum dot protective layer solution; and adding quantum dots to the mixture in any one of the above Steps 11-14;
   wherein in Step 11, the poly triacetylcellulose has a degree of polymerization of 250-350;
   wherein in Step 11, the solvent comprises a primary solvent and an auxiliary solvent, the primary solvent is dichloromethane, and the auxiliary solvent is methanol, ethanol, or butanol;
   wherein the plasticizer is a mixed plasticizer comprising a primary plasticizer and an auxiliary plasticizer, the primary plasticizer is triphenyl phosphate, and the auxiliary plasticizer is one or more of the following: dibutyl phthalate, butoxyethyl phthalate, and octyl phthalate.

9. The method according to claim 8, wherein the quantum dots are doped or non-doped quantum dots and they are selected from one or more of the following materials: ZnS, CdS, ZnO, GaN, GaSe, ZnSe, CdSe, ZnTe, CdTe, PbTe, InP, CdAs.

10. The method according to claim 8, wherein the quantum dots are graphene quantum dots or carbon quantum dots.

11. The method according to claim 8, wherein in Step 11, the stirring time is 2 hours; in Step 12, the stirring time is 3 hours; in Step 13, the stirring time is 2 hours; and in Step 14, the stirring time is 1 hour.

* * * * *